United States Patent Office 2,834,751
Patented May 13, 1958

2,834,751

COMPOSITIONS COMPRISING HYDROGENATED CONJUGATED DIENE POLYMERS AND POLY-1-OLEFINS

Rufus V. Jones, Bartlesville, Okla., assignor to Phillips Petroleum Company, a corporation of Delaware No Drawing. Application April 23, 1953
Serial No. 350,779

7 Claims. (Cl. 260—45.5)

This invention relates to compositions comprising poly-1-olefins blended with hydrogenated conjugated diene polymers. In a further aspect this invention relates to compositions of these materials which are vulcanizable. In a further aspect this invention relates to a method for modifying the properties of poly-1-olefins in order to produce compositions having good molding characteristics, good oil resistance, increased flexibility over wide temperature ranges and materials which have good ozone resistance.

Poly-1-olefins, and polyethylene, have properties which make these materials very suitable for a wide range of applications. Hydrogenated conjugated diene polymers also have properties which make them very useful. I have found that a blend of these materials is, for many applications, superior to either of the materials used alone.

Each of the following objects of this invention is obtained by at least one of the aspects of this invention.

An object of this invention is to prepare new compositions comprising a blend of poly-1-olefins and hydrogenated conjugated diene polymers. A further object of this invention is to provide vulcanizable compositions of these materials. A further object of this invention is to improve the low temperature properties of poly-1-olefins. A further object of this invention is to provide polymers of hydrogenated conjugated dienes having superior molding and extrusion properties, improved oil resistance, and improved ozone resistance.

As one of the starting materials for this invention I use hydrogenated conjugated diene polymers which can range from liquids to thermoplastic resins. A preferred method for the preparation of these polymers is described in copending application of Jones and Moberly, filed December 26, 1950, Serial No. 202,797, now abandoned. In this process the polymer to be hydrogenated, after being freed of salts or other materials which might act as hydrogenation catalyst poisons, is charged to a hydrogenation reactor, generally as a solution or dispersion of the polymer in a suitable solvent. A hydrogenation catalyst is then added, hydrogen is introduced into the reactor, and the temperature is raised to the desired level. When the desired degree of hydrogenation has been obtained, the catalyst is removed. Additional solvent is frequently added to decrease the viscosity of the mixture and to facilitate this removal which is effected by filtration, centrifugation, magnetic separation, or other suitable means. The solvent is finally removed, preferably in vacuo, and the product recovered.

In the present invention, I prefer to use polymers which have a degree of unsaturation in the range from 10 to 50 percent, and more preferably from 10 to 30 percent of that originally present in the unhydrogenated polymer. However, polymers more completely hydrogenated can be used including those which are completely hydrogenated, but where completely hydrogenated polymers are used, the final compositions are not vulcanizable. Partially hydrogenated polymers are more compatible with polyethylene than are the unhydrogenated polymers.

As stated above, these hydrogenated polymers can be prepared from liquid to rubbery polymers and include homopolymers of conjugated dienes, preferably containing not more than 8 carbon atoms per molecule, and copolymers of these conjugated dienes with materials copolymerizable therewith. Suitable copolymerizable materials include styrene, alkyl-substituted styrenes, acrylic and methacrylic acids and esters thereof. Hydrogenation of a liquid polymer yields a liquid product while hydrogenation of a rubbery polymer yields a thermoplastic resin.

I have prepared compositions according to the present invention using poly-1-olefins such as those commercially available from other sources as well as poly-1-olefins prepared by a new and novel method according to a copending applications of Hogan and Banks, filed January 27, 1953, Serial No. 333,576, assigned to the assignee of the present application, and such polyethylene prepared according to this process will hereinafter be identified as Polyethylene A.

Polyethylene is the polyolefin most frequently employed and, in the present discussion, is frequently used, although it should be understood that polymers of the higher olefins are also suitable.

Of special interest are the polymers prepared according to the above identified application of Hogan and Banks. According to the method there described, polymers are prepared by polymerizing 1-olefins having a maximum monomer chain length of 8 carbon atoms and no branching nearer the double bond than the 4-position, the resulting products being tacky, semi-solid, and solid polymers. The catalyst used is chromium oxide containing hexavalent chromium, supported upon silica, alumina, or silica-alumina, the amount of chromium oxide in the catalyst ranging from 0.1 to 10 or more weight percent of the supporting material. Steam treatment of the support improves the activity and life of the catalyst in the polymerization reaction.

The reaction is preferably carried out in liquid phase, although vapor phase operation is possible. The temperature used depends to some extent upon various factors, such as the solvent, but normally ranges from about 150 to 450° F. The preferred range for propylene and higher 1-olefins is 150 to 250° F. and that for ethylene is 275 to 375° F. Preferred diluents or solvents are aliphatic paraffins containing 3 to 12 carbon atoms per molecule, although any hydrocarbon diluent which is relatively inert, non-deleterious, and liquid under the reaction conditions can be utilized. In order to maintain liquid phase operation, superatmospheric pressures are used. Pressures of approximately 500 p. s. i. g. are preferred but lower pressures, down to 100 p. s. i. g., depending upon the feed and the temperature, can be used.

The reaction can be carried out in a fixed-bed or a moving-bed catalyst chamber. Also, the reaction may be carried out in a catalyst slurry. Specific examples of the preparation of these polymers are set forth in the Hogan and Banks application.

Polyethylene produced by this process is principally a solid polymer having a melting point in the range of 235 to 260° F., a density in the range of 0.92 to 0.97, an intrinsic viscosity in the range of 0.2 to 1.2 and a weight-average molecular weight in a range of approximately 5,000 to 30,000, often 5,000 to 20,000. The melting point was determined from a cooling curve of temperature versus time and the weight-average molecular weights were determined by the method based upon the intrinsic viscosity of the polymer.

A study and comparison was made between the Polyethylene A of the Hogan and Banks invention and nine commercial trade-marked polyethylenes. It was found that the polyethylene of that invention differs materially in melting point from commercial polyethylenes, its melting point being in the range of 235 to 260° F. All of the other polyethylenes had considerably lower melting points, the closest one melting at about 228° F. The density of this new polyethylene is also higher than the density of any of the other polyethylenes, the average density of the new polyethylene being 0.952 as compared with 0.936 for the highest density of any of the commercial polyethylene tested. Another significant difference between the new polyethylene and the commercial polyethylenes is the Shore "D" hardness which is 62 for the new polyethylene as compared with 48 for the hardest of the commercial polyethylenes. All of the comparisons were made on the basis of comparable tests.

The reason for the higher melting point, greater density, and hardness of the Polyethylene A as compared with the commercial polyethylenes is not definitely known, but it may be due to the different type of molecule which is formed by the process of the invention in the presence of chromium oxide-silica-alumina catalyst.

A study was made of a large number of samples of this new Polyethylene A by infra-red spectroscopy. The resulting spectrograms were compared with the spectrograms of commercial polyethylenes and it was observed that in every instance the major portion of the unsaturation in the new ethylene polymer molecule was trans-internal and/or vinyl while that of commercial polyethylene was of the branched vinyl type of unsaturation. The major portion of the unsaturation in all of the polypropylene prepared by the method of the above-identified Hogan and Banks application samples tested and also in all of the other polymers made in accordance with the invention of Hogan and Banks was found to be trans-internal and/or vinyl. Trans-internal type of unsaturation is represented by the arrangement

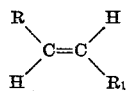

in which R and $R_1$ may be the same or different alkyl radicals. Vinyl type of unsaturation is characterized by the structure —CH=$CH_2$. This group may be attached to the molecule either internally or terminally such as

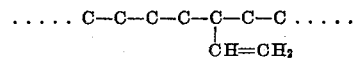

or

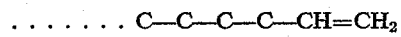

These structures are definitely different types of structures from those predominating in the polymers of the prior art, which have been found and are known in the literature to have the major portion of their unsaturation of the branched vinyl type, which may be illustrated, for example, by the structure

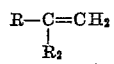

The characteristic of branched vinyl type of unsaturation is two hydrocarbon radical substituents on the same carbon atom of the vinyl group and two hydrogen atoms on the other carbon atom of the vinyl group. This trans-internal and/or vinyl arrangement of the major portion of the unsaturation in all of these new polymers studied by infra-red spectroscopy is probably due to the mechanism of the novel polymerization reaction in the presence of chromium oxide-silica and/or alumina which is different from that utilized in the polymerization reactions of the prior art. The same type of unsaturation is found in all of the new polymers including copolymers such as ethylene-propylene copolymer. It is probably due to this mechanism by which the olefin units are built into large molecules which accounts for the position of the unsaturation of the molecule and also accounts for the different characteristics of the resulting polymer. Another significant factor with respect to the new polyethylene is that it is the only polyethylene known to have been made at pressures under 1000 p. s. i. Apparently, the only pressure that is required is that which is sufficient to maintain the diluent in liquid phase so that the diluent will wash the heavy polymer off the catalyst and prevent its deactivation.

A comparison of the type of unsaturation possessed by the new polyethylene with that of two representative commercial polyethylenes is shown in Table I.

TABLE I

| Polymer | M. W. | Double Bonds per Molecule | | |
|---|---|---|---|---|
| | | $R_1\phantom{xxx}H$ $\phantom{xx}C=C$ $H\phantom{xxx}R_2$ Trans-internal | $R_1\phantom{xxx}H$ $\phantom{xx}C=C$ $H\phantom{xxx}H$ Vinyl | $R_1\phantom{xxx}H$ $\phantom{xx}C=C$ $R_2\phantom{xxx}H$ Branched Vinyl |
| Polyethylene "A" | 11,000 | 2 | 0.2 | 0.2 |
| Polyethylene "F" | 5,000 | 0.05 | 0.05 | 0.5 |
| Polyethylene "E" | 5,000 | 0.05 | 0.05 | 0.6 |

From the table it is apparent that in Polyethylene "A," more than 83 percent of the unsaturation is trans-internal while in the commercial Polyethylene "F," about 83 percent of the unsaturation is of the branched-vinyl type and in commercial Polyethylene "E" about 93 percent of the unsaturation is of the branched-vinyl type.

The percentages of the various components in the compositions of the present invention is varied according to the properties desired in the resulting composition. I generally prefer that the product contained from 50 to 90 parts by weight of poly-1-olefin and from 50 to 10 parts by weight of the hydrogenated conjugated diene polymer per 100 parts of the composition.

However, much broader ranges can be employed, for example, from 5 to 95 parts by weight of either component per 100 parts of the composition. When hydrogenated liquid polymers are used in the composition, smaller quantities of the polymer are used than is frequently the case when rubbery polymers are used. In general, the amount of liquid hydrogenated polymer is 25 parts or less per 100 parts of the total composition. Furthermore, blends can be prepared using more than one type of polyethylene and more than one poly-1-olefin.

As pointed out previously, the materials of this invention are vulcanizable. Polyethylene is thermoplastic and can be molded but it is not vulcanizable. The products of this invention are useful for the production of various shapes or molded articles, coatings of various kinds including coatings for wire, sheets, flexible tubing, etc.

The particular formulation will depend upon the properties desired in the product. For instance, hydrogenated conjugated diene polymers which are solid are flexible at very low temperatures. However, one drawback to the use of this material is that an extruded surface usually has a rough or uneven finish, the product having some "nerve" or "memory." If a minor proportion, as low as 5 percent by weight, of polyethylene is added to the hydrogenated diene polymer, the molding and extrusion properties of the hydrogenated material is improved.

While hydrogenated diene polymers have fairly good resistance to hydrocarbon solvents, this oil resistance is further improved by the addition of polyethylene. Furthermore, compounding of the blend of these materials further increases the oil resistance. Conversely, polyethylene tends to be somewhat stiff and is susceptible to cracking. The addition of a small amount of hydrogenated conjugated diene polymer shows a marked improvement in the flexibility and resistance to cracking of the polyethylene.

For instance, a gasoline pump hose stock could be considered. Such an application requires resistance to hydrocarbon solvents, flexibility, and resistance to both high and low temperatures. Also the hose stock, being exposed, would have to be resistant to ozone. The polyethylene component would offer resistance to the hydrocarbon solvent and would supply the desirable high temperature characteristics of that material. The hydrogenated conjugated diene polymer component would result in the material remaining flexible at low temperatures and would provide a material which could be vulcanized. Such a mixture would be resistant to ozone.

Another application would be materials designed for use in arctic regions or in high flying aircraft where extremely low temperatures are encountered. Specifications for this material require flexibility at temperatures as low as −65° F. Compositions meeting these requirements are possible when compositions are made using from 60 to 65 or more percent by weight hydrogenated conjugated diene polymers.

In my work on these compositions containing poly-1-olefins and hydrogenated conjugated diene polymers a great many different runs have been made. Certain representative data is set forth in the following tables which present certain properties of selected materials, but these are set forth for the purpose of more fully describing the present invention and should not be considered to limit the invention to the specific details shown.

*Example I*

In these runs a 41° F. polybutadiene rubber having a Mooney value (ML-4) of 20 was hydrogenated in five different batches all at 500° F. and 500 p. s. i. g. in methylcyclohexane using 15% by weight, based on the rubber, of a reduced nickel/kieselguhr catalyst. The unsaturation of these runs ranged from 6.1% to 10.5% giving an average of 9.9% when the five runs were combined. This hydrogenated material was blended with a commercial polyethylene in amounts of 5 percent and 50 percent by weight. Table II sets forth certain properties of this material.

to that used in Example I, a quantity of this rubber was hydrogenated to a value of 14.7 percent unsaturation. This hydrogenated conjugated diene polymer was blended with Polyethylene A. These blends contain a major proportion of the hydrogenated conjugated diene polymer. The results of certain physical properties of these blended materials are shown in Table III.

TABLE III.—HYDROGENATED POLYBUTADIENE BLENDED WITH POLYETHYLENE

|  | Flex Temp., °F. | Swell, percent 75°F. | Softening Point, °F. | Tensile, p. s. i. |
|---|---|---|---|---|
| Hydrogenated Polybutadiene | −90 | 156 | 160 | 816 |
| Polyethylene |  |  | 243.5 | 1,300 |
| 90% Hydrogenated Polybutadiene, 10% Polyethylene | −85.0 | 87.2 | 165.0 | 769.0 |
| 80% Hydrogenated Polybutadiene, 20% Polyethylene | −78.0 | 66.5 | 194.0 | 955 |
| 70% Hydrogenated Polybutadiene, 30% Polyethylene | −66.0 | 55.2 | 210.0 | 1,166 |
| 60% Hydrogenated Polybutadiene, 40% Polyethylene | −61.0 | 43.6 | 235.0 | 1,370 |
| 50% Hydrogenated Polybutadiene, 50% Polyethylene |  | 22.1 | 230.0 | 1,921 |

In Table III the low temperature flex properties are shown as well as the percent swell, softening point, and tensile strength. Swelling tests were made by immersing the material in a mixture containing 30 percent toluene and 70 percent isooctane for seven days. As mentioned above, certain military specifications require that the plastics for specialized applications be flexible at temperatures of −65° F. From this table it will be seen that up to 30 percent polyethylene can be used and the product will still meet such specifications. This table also brings out the fact that the percent swell of the blended material improves as the amount of polyethylene is increased. Another valuable result appears when the softening point is considered, since, when a major portion of the composition is polyethylene, the softening point is above the boiling point of water at atmospheric pressure. Thus, compositions can be made which can be sterilized by the simple procedure of dipping the materials in the boiling water. Likewise the tensile strength is improved as the amount of polyethylene is increased.

TABLE II

|  | Film Quality Tack | Haze, Percent | Tensile Strength, lb. p. s. i. | 3-Minute Shrinkage in Water at 100° C. | Moisture Vapor Transmission, g./mill/100 sq. in. | Gas Transmission, cc./100 sq. in./24 hrs./.001 | | |
|---|---|---|---|---|---|---|---|---|
|  |  |  |  |  |  | $O_2$ | $N_2$ | $CO_2$ |
| Hydrogenated Polybutadiene | Tacky | 3.15 | 1,925 | 77.3 | 4.79 | 1,326 | 513 | 7,535 |
| 5% Hydrogenated Polybutadiene, 95% Polyethylene | Very Slightly Tacky |  | 2,408 | 0.8 | 1.29 | 679 | 200 | 3,123 |
| 50% Hydrogenated Polybutadiene, 50% Polyethylene | Slightly Tacky | 3.6 | 2,730 | 20.2 | 2.03 | 1,088 | 341 | 5,034 |
| Polyethylene | Very Slightly Tacky | 7.2 | 2,298 | 2.8 | 1.18 | 604 | 189 | 2,823 |

Consideration of Table II shows the remarkable fact that the tensile strength of the blended material is higher than the tensile strength of the straight hydrogenated conjugated diene polymer or that of the polyethylene alone. Furthermore, the shrinkage in water is greater than that for the straight polyethylene when the 50–50 mixture is used and the gas transmission is likewise increased. Both of these factors produce superior results in the packaging of foodstuffs. The moisture vapor transmission is also satisfactory as are the other qualities of the film.

*Example II*

Using a polybutadiene rubber of similar characteristics

*Example III*

Another hydrogenated conjugated diene polymer was prepared in the same manner as that of Example I, this time to an unsaturation of 8.5 percent. This material was blended with commercial polyethylene and the Polyethylene A prepared over the supported chromium oxide catalyst of Hogan and Banks. The results of physical tests made upon these compositions are set forth in Table IV, the commercial polyethylene being so designated and that made according to the method of Hogan and Banks as Polyethylene A.

TABLE IV

|  | Density | Tensile, p. s. i. | Percent Elong. | Flex Temp., °F | Percent Swell | Soft. Pt., °F. |
|---|---|---|---|---|---|---|
| Hydrogenated Polybutadiene | .894 | 1,930 | 680 | −85.5 | 79.2 | 180 |
| 80% Hydrogenated Polybutadiene, 20% Polyethylene A | .906 | 1,906 | 740 | −70.0 | 45.2 | 216 |
| 80% Hydrogenated Polybutadiene, 20% Commercial Polyethylene | .903 | 2,100 | 710 | −80.0 | 54.6 | 200 |
| 65% Hydrogenated Polybutadiene, 35% Polyethylene A | .918 | 1,409 | 600 | −68.0 | 35.2 | 230 |
| 65% Hydrogenated Polybutadiene, 35% Commercial Polyethylene |  | 2,070 | 750 | −73.2 | 43.4 | 213 |
| 50% Hydrogenated Polybutadiene, 50% Polyethylene A | .926 | 1,553 | 50 | −45.0 | 23.7 | 233 |
| 50% Hydrogenated Polybutadiene, 50% Commercial Polyethylene | .908 | 2,000 | 710 | −59.0 | 35.4 | 213 |

The data of this table shows the same superior properties that are brought out in the previous tabulations, but, it should be noted that the comparison as to softening points is directly comparable in this table. The Polyethylene A used had a softening point of 250°, this being higher than the products known commercially. When at least 20 percent of this material is combined with the hydrogenated conjugated diene polymer the softening point of the composition is above the boiling point of water at atmospheric pressure. Using 50 percent polyethylene and the same hydrogenated polymer, the temperature is 213° F. but this temperature allows no margin of safety.

*Example IV*

By using sodium catalyzed polymerization, liquid polybutadiene having a viscosity of 386 Saybolt Furol seconds at 100° F. was prepared. A portion was hydrogenated to an unsaturation of 29 percent. A further quantity of this liquid polybutadiene was hydrogenated to an unsaturation of 15.9 percent. Blends of 90 parts by weight of a commercial polyethylene and 10 parts by weight of the liquid polybutadiene, and each of the 2 hydrogenated polybutadienes were prepared. Physical tests on each of these materials together with the tests on polyethylene alone were run. The data on these tests appears in Table V.

TABLE V

|  | Tensile, p. s. i. | Percent Elongation | Percent Swell | Percent Extracted | Gehman Data [1] | | |
|---|---|---|---|---|---|---|---|
|  |  |  |  |  | T-2 | T-5, °C. | T-10 |
| Liquid polybutadiene | 1,110 | 300 | 52.5 | 3.9 | 0 | −25 | −39 |
| Polybutadiene, 29% unsat'n | 1,000 | 450 | 52.8 | 5.5 | 4 | −29 | −40 |
| Polybutadiene, 15.9% unsat'n | 940 | 120 | 32.8 | 9.0 | −2 | −29 | −47 |
| None | 1,170 | 220 | 47.7 | 1.1 | 0 | −26 | −42 |

[1] The Gehman values are the temperatures (°C.) corresponding to the point at which the stock becomes 2, 5, or 10 times as stiff as it was at 25° C.

*Example V*

A quantity of polybutadiene, prepared by emulsion polymerization and having a Mooney value (ML-4) of 27 was hydrogenated to an unsaturation of 22.8 percent. A blend of 50 parts by weight of commercial polyethylene and 50 parts by weight of this hydrogenated polymer were prepared and the resultant blend compounded according to the following formula:

| | Parts by weight |
|---|---|
| 50/50 polyethylene - hydrogenated polybutadiene blend | 100 |
| Zinc oxide | 3 |
| Stearic acid | 2 |
| Sulfur | 2 |
| Santocure [1] | 1 |
| A-32 [2] | 0.2 |

[1] N-cyclohexyl-2-benzothiazolesulfenamide.
[2] Reaction product of butyraldehyde and butylidene aniline.

Following vulcanization this material was tested and found to have a tensile strength of 1890 p. s. i. and a percent swell of 50.3. Samples of this material exhibited good low temperature properties following vulcanization.

As many possible embodiments may be made of this invention without departing from the scope thereof, it is to be understood that all matter herein set forth is to be interpreted as illustrative and not in a limiting sense.

I claim:

1. As a new composition of matter, a resinous blend comprising a normally solid polyethylene and a partially hydrogenated polybutadiene wherein at least 50 percent but not all of the double bonds of the unhydrogenated polybutadiene have been saturated, the partially hydrogenated polybutadiene constituting from 5 to 95 weight percent of said blend.

2. As a new composition of matter, a resinous blend comprising a normally solid polyethylene and a resinous partially hydrogenated polybutadiene wherein at least 50 percent but not all of the double bonds of the unhydrogenated polybutadiene have been saturated, said partially hydrogenated polybutadiene constituting from 5 to 60 weight percent of said blend.

3. A composition according to claim 2 wherein said polyethylene is produced by polymerizing ethylene in the presence of a catalyst comprising chromium oxide associated with at least one material selected from the group consisting of silica, alumina and silica-alumina composites at a temperature in the range 150 to 450° F.

4. A composition according to claim 2 wherein said partially hydrogenated polybutadiene contains from 10 to 30 percent of the double bonds which were present before the hydrogenation.

5. As a new composition of matter, a resinous blend comprising a normally solid polyethylene and a resinous partially hydrogenated polybutadiene wherein at least 50 percent but not all of the double bonds of the unhydrogenated polybutadiene have been saturated, said partially hydrogenated polybutadiene constituting from 10 to 50 weight percent of said blend.

6. As a new composition of matter, a resinous blend of a normally solid polyethylene and a resinous partially hydrogenated polybutadiene wherein from 50 to 90 percent of the double bonds of the unhydrogenated polybutadiene have been saturated, said partially hydrogenated polybutadiene constituting from 5 to 60 weight percent of said blend.

7. As a new composition of matter, a resinous blend of a normally solid polyethylene and a resinous partially hydrogenated polybutadiene wherein from 50 to 90 percent of the double bonds of the unhydrogenated polybutadiene have been saturated, said partially hydrogenated polybutadiene constituting from 10 to 50 weight percent of said blend.

References Cited in the file of this patent

UNITED STATES PATENTS

| | | |
|---|---|---|
| 2,213,423 | Wiezevich | Sept. 3, 1940 |
| 2,369,471 | Latham | Feb. 13, 1945 |
| 2,449,949 | Morris et al. | Sept. 21, 1948 |
| 2,582,037 | Hyde | Jan. 8, 1952 |

OTHER REFERENCES

Hahn et al.: "Polythene," Ind. Eng. Chem., June 1945, pages 526–533.